United States Patent [19]

Bardon et al.

[11] Patent Number: 6,081,271

[45] Date of Patent: Jun. 27, 2000

[54] DETERMINING VIEW POINT ON OBJECTS AUTOMATICALLY IN THREE-DIMENSIONAL WORKSPACE FROM OTHER ENVIRONMENTAL OBJECTS IN A THREE-DIMENSIONAL WORKSPACE

[75] Inventors: Didier Daniel Claude Bardon, Austin; Richard Edmond Berry, Georgetown, both of Tex.

[73] Assignee: International Business Machines Corporation, Armonk, N.Y.

[21] Appl. No.: 08/862,824

[22] Filed: May 23, 1997

[51] Int. Cl.[7] ................................................. G06T 17/00
[52] U.S. Cl. .......................................... 345/419; 345/427
[58] Field of Search ..................................... 345/418, 419, 345/423, 424, 425, 427

[56] References Cited

U.S. PATENT DOCUMENTS

| | | | |
|---|---|---|---|
| 5,166,878 | 11/1992 | Poelstra | 364/424.01 |
| 5,384,584 | 1/1995 | Yoshida et al. | 346/76 |
| 5,528,735 | 6/1996 | Strasnick et al. | 345/427 |
| 5,577,960 | 11/1996 | Sasaki | 463/32 |
| 5,594,842 | 1/1997 | Kaufman et al. | 395/124 |
| 5,598,516 | 1/1997 | Mori | 395/126 |

*Primary Examiner*—Phu K. Nguyen
*Assistant Examiner*—Cliff N. Vo
*Attorney, Agent, or Firm*—Paul Kraft; Volel Emile; Mark E. McBurney

[57] ABSTRACT

A system, method and computer program are provided for a virtual three-dimensional workspace, wherein certain 3-D objects can automatically provide a view point on themselves, that also make other neighboring objects visible according to a hierarchy of relevance and proximity, in three- dimensional workspace. The system subsequently serves to orient the viewer upon completion of an interactive task with one of the functional objects in the three-dimensional workspace.

18 Claims, 6 Drawing Sheets

DETERMINING VIEW POINT ON OBJECTS AUTOMATICALLY IN THREE-DIMENSIONAL WORKSPACE FROM OTHER ENVIRONMENTAL OBJECTS IN A THREE-DIMENSIONAL WORKSPACE

TECHNICAL FIELD

The present invention relates to user interactive computer supported display technology and particularly to such user interactive systems and methods which are user friendly, i.e. provide even noncomputer literate users with an interface environment which is easy to use and intuitive.

BACKGROUND OF THE INVENTION

The 1990's decade has been marked by a societal technological revolution driven by the convergence of the data processing industry with the consumer electronics industry. This advance has been even further accelerated by the extensive consumer and business involvement in the internet over the past two years. As a result of these changes, it seems as if virtually all aspects of human endeavor in the industrialized world requires human-computer interfaces. As a result of these profound changes, there is a need to make computer directed activities accessible to a substantial portion of the world's population which, up to a year or two ago, was computer-illiterate, or at best computer indifferent. In order for the vast computer supported market places to continue and be commercially productive, it will be necessary for a large segment of computer indifferent consumers to be involved in computer interfaces. Thus, the challenge of our technology is to create interfaces to computers which are as close to the real world as possible.

Industry has been working towards this challenge and there is presently a relatively high degree of realism possible in interfaces. This presents a need and an opportunity for even more realistic interaction techniques to better match the visual metaphors used and to achieve a higher level of ease of use for computer systems. We are striving towards the representation of object as photo realistic, three-dimensional (3D) models rather than as the icons and two-dimensional desktops of conventional computer technology.

Some examples of current technology for the creation of virtual three-dimensional workspace display interfaces are copending application Ser. No. 08/753,081, entitled "CREATING REAL WORLD OBJECTS" and Ser. No. 08/753,076, entitled "SYSTEM AND METHOD FOR MAINTAINING SIZE AND POSITION RELATIONSHIPS FOR NONRECTANGULAR REAL WORLD OBJECTS", assigned to the Assignee of the present application.

A 3D virtual workspace display environment is also described in an article entitled, "RAPID CONTROLLED MOVEMENT THROUGH A VIRTUAL 3D WORKSPACE", Jock Mackinlay et al., *Computer Graphics Publication*, Vol. 24, No. 4, August 1990, pp. 171–175, as well as in its related U.S. Pat. No. 5,276,785.

A more recent copending application assigned to the Assignee of the present invention is entitled, "VIEWER INTERACTIVE OBJECT IN VIRTUAL THREE-DIMENSIONAL WORKSPACE", D. Bardon et al. (Attorney Docket No. AT9-96310), which covers face views of virtual three-dimensional objects which may be triggered to appear on a display by interactive viewer input.

It is clear that current technology in virtual three-dimensional workspaces has provided environments which are user friendly, i.e. make the casual computer user feel more comfortable and at home with the interface. However, researchers in human factors have found downsides to three-dimensional virtual reality displays. Because of the many choices that the user has in wandering down various "streets and roads" or visiting a wide variety of "buildings or stores" or going through many possible "doors", the user may wander through this reality and perhaps get lost from the track or goal he is pursuing.

The present invention addresses this problem, i.e. that of helping the interactive user in three-dimensional graphic environments to stay focused and relate to the objects he is seeking to relate to in the manner he is seeking to relate to such objects even when these objects are arranged in 3D space in what appears to be infinite configurations.

In these virtual reality 3D environments as in the real world, the viewer or user is relating to the virtual objects in order to carry out a wide variety of tasks, some of which are quite simple and some very complex. In order for the user to stay focused and carry out his tasks as expeditiously as possible, it would be optimum for the virtual 3D system to provide user interfaces which maintain the user's orientation in the 3-D environment even when the user is carrying out complex interactive tasks with a 3-D object.

On the other hand, the navigating viewer's task may be a more complex one like tracking and updating product sales information of a business or group of businesses or within a report or filing a tax statement.

The present invention addresses this problem, i.e. that of helping the interactive user in three-dimensional graphic environments to stay focused and relate to the objects he or she is seeking to relate to in the manner he or she is seeking to relate to such objects even when these objects are arranged in 3D space in what appears to be infinite configurations. The invention facilitates the user's navigation in the 3D space so that the user may easily and quickly continue or change navigational path after he has completed an interactive function with respect to a 3-D object.

SUMMARY OF THE INVENTION

Before setting forth the present invention, we should establish some basic characteristics of the virtual three-dimensional environment as described in the above-referenced patents and applications. It is understood that in order to navigate through three-dimensional space, view the space or relate to objects within the space, a viewpoint is determined within that space. That viewpoint is the virtual position of the viewer or person who is navigating within the three-dimensional space. The viewpoint is commonly defined by its position and its orientation or direction. For purposes of describing this invention, we will use the metaphor of a camera to understand the viewpoint. The camera's position and orientation are where it is and which way it is pointing. Let us refer to another property of a viewpoint which is "field of view"; this is effectively the resulting view from a given viewpoint. A key need of a viewer navigating through virtual three-dimensional space is to stay focused.

As set forth above, it is easier to stay focused when the task for which he is accessing the object is a simple one. The present invention deals with helping viewers to stay focused in more complex tasks.

The present invention operates within the previously described data processor controlled display system for displaying a virtual three-dimensional environment having three-dimensional objects which are interactively functional, i.e. may be picked by the viewer or user for various computer interactive functions. A key need of a viewer navigating through virtual tree-dimensional space is to stay focused on the direction in which the viewer or user is interactively navigating and to choose the users's path as well as branches in the path as easily quickly as possible.

It is the purpose of the present invention to keep the viewer or user oriented with 3-D workspace so that while he is performing even complex interactive tasks with respect to 3-D objects, he is continuously aware of his position in 3-D workspace environment so that when he completes the task and he "Looks Up", he is not lost and can readily continue on his planned path.

The present invention relates to user-computer interface architecture. In this architecture, user objects may have views in the three-dimensional virtual environment. These object views are actually 3D geometry displayed in the virtual world, this term is used here in it's programming sense; the set of things that make a particular object's model perceptible to the user. When the user needs to interact with an object's view, the user has to orient the virtual camera (we use the metaphor of a camera to understand the viewpoint) toward the object or access a point of view on it, using available interaction techniques. For example to interact with a telephone object in 3-D, the user can orient the virtual camera toward the telephone, or click on the telephone, which causes the system to automatically navigate the virtual camera into a special position called the "preferred point of view" on the telephone. The current invention addresses the problem of computing the camera position with respect to a particular object "on-the-fly", that will yield the most preferred point of view of that object. Indeed the contents visible in the preferred point of view of an object ( e.g. a telephone) depends directly on the position of the virtual camera with respect to the object. It is therefore important to design a method for determining this position. This invention accomplishes this task in the following manner.

The factor that determines the usefulness of the preferred view on an object's representation is the amount of surrounding context that has to be visible for the resulting image to be useful. For example, if a user requests a point of view on a telephone object, the resulting image should include enough surrounding context to allow other related objects to be visible. Should the user then request a point of view on the telephone key pad, the resulting image should include the entire phone object, which will give enough of a close up view of the key pad while showing also the other controls existing on the telephone.

The method for computing the preferred point of vie on any object "on-the-fly" is to determine, at design time, the amount of surrounding visual context that should be included in the resulting image. This amount of necessary visual context is recorded in the object definition as one of it's properties. This property is used to determine the position of the virtual camera automatically, at run time, whenever the user requests a preferred point of view on an object representation. When the viewer has completed their interaction with the desired object (e.g. phone call on a telephone) in 3-dimension workspace,.the surrounding environment context relating to the object (e.g. telephone) will subsequently help orient the viewer or camera to his or her location in the larger 3-dimensional workspace.

In accordance with a more particular aspect of the present invention, because of the object oriented programming environment which is used to implement the present invention, the virtual three-dimensional object is stored in the computer and treated as an entity whereby the three-dimensional object may be changed in size, position and appearance.

BRIEF DESCRIPTION OF THE DRAWINGS

FIG. 3 is an enlarged representation of a portion of the virtual reality workspace of FIG. 2, after the viewer has made a navigational change by selecting an environmental object, such as a desk, containing a telephone which he or she intends to interact with.

DETAILED DESCRIPTION OF THE PREFERRED EMBODIMENT

Figure 1:
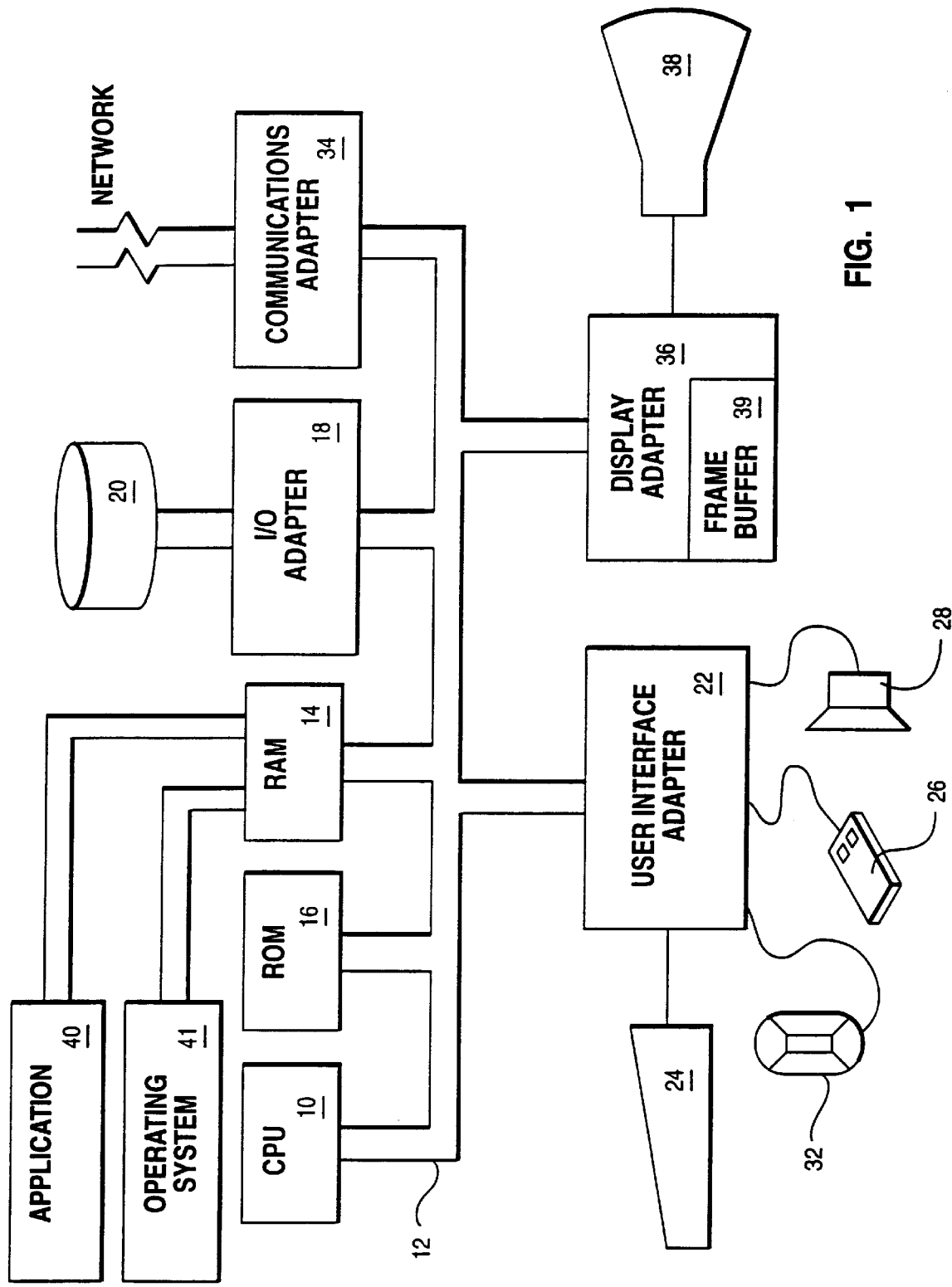
FIG. 1 is a block diagram of a data processing system including a central processing unit which is capable of implementing the present invention.

Before going into the details of specific embodiments, it will be helpful to understand from a more general perspective the various elements and method which may be used to implement the present invention. The present invention is implemented in three-dimensional virtual workspace. A three-dimensional workspace is a workspace that is perceived as extending in three orthogonal directions. Typically a display has a two-dimensional display surface and the perception of a third dimension is effected by visual clues such as perspective lines extending toward a vanishing point. Distant objects are obscured by nearer objects. The three-dimensional effect is also provided by showing changes in objects as they move toward or away from the viewer. Perspective shading of objects and a variety of shadowing of objects at different distances from the viewer also contribute to the three-dimensional effect.

A three-dimensional workspace is typically perceived as being viewed from a position within the workspace. This position is a viewpoint. This viewpoint provides the virtual interface between the display user and the display. The viewpoint's direction of orientation is the direction from the viewpoint into the field of view along the axis at the center of the field of view.

In order to present a three-dimensional workspace, a system may store data indicating "coordinates" of the position of an object, a viewpoint or other display feature in the workspace. Data indicating coordinates of a display feature can then be used in presenting the display feature so that it is perceptible as positioned at the indicated coordinates. The "distance" between two display features is the perceptible distance between them, and can be determined from their coordinates if they are presented so that they appear to be positioned at their coordinates.

Techniques for providing and handling three-dimensional objects in a three-dimensional virtual workspace have been developed in the art and are available to display user interface designers. U.S. Pat. No. 5,276,785 (Mackinlay et al., Jan. 4, 1994) is an example of the design techniques available to such three-dimensional workspace interface designers.

The description of the present invention often refers to navigation within the three-dimensional virtual workspace. The workspace or landscape is navigable using conventional three-dimensional navigation techniques. A user may move around or navigate within the three-dimensional data representation to alter his perspective and view of the displayed representation of the data. Thus, a user may be referred to as a navigator. The navigator is actually stationary, and his view of the display space changes to give him the sensation of moving within the three-dimensional graphical space. Thus, we speak in terms of the navigator's perceived motion when we refer to changes in his view of the display space. As the user moves, his view of the data changes accordingly within the three-dimensional data representation. Some navigation modes include browsing, searching and data movement. U.S. Pat. No. 5,555,354 (Strasnick et al., Sep. 10, 1996) describes some known navigation techniques.

The three-dimensional objects which will be subsequently described in embodiments of the present invention may be best implemented using object oriented programming techniques, such as the object oriented techniques described in the above-mentioned copending application Ser. No. 08/753,076 assigned to the Assignee of the present invention. The objects of that copending application are implemented using the C++ programming language. C++ is a compiled language.

The programs are written in human readable script and this script is provided to another program called a compiler to generate a machine readable numeric code which can be loaded into, and directly executed by the computer. The C++ language possesses certain characteristics which allow a software developer to easily use programs written by others while still providing a great deal of control over the reuse of programs to prevent their destruction or improper use. The C++ language is well known and many articles and text are available which describe the language in detail.

While the embodiment of the present invention, which will be subsequently described, can be implemented using object oriented techniques involving the C++ programming language, we found it effective to use SCL as used in VRT: the Virtual Reality Toolkit developed and marketed by Superscape Ltd. having U.S. offices in Palo Alto, California. Extensive details of these programming techniques may be found in the Superscape VRT, Reference Manual, Version 4-00, 2d Edition, Jan. 29, 1996.

It should be understood by those skilled in the art hat object oriented programming techniques involve the definition, creation, use and instruction of "objects". These objects are software entities comprising data elements and routines, or methods, which manipulate the data elements. The data and related methods are treated by the software as an entity and can be created, used and deleted as such. The data and functions enable objects to model their real world equivalent entity in terms of its attributes, which can be presented by the data elements, and its behavior which can be represented by its methods.

Objects are defined by creating "classes" which are not objects themselves, but which act as templates which instruct a compiler how to construct the actual object. For example, a class may specify the number and type of data variables and the steps involved in the functions which manipulate the data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object oriented programming techniques, encapsulation, polymorphism and inheritance. Objects can be designed to hide, or encapsulate, all or a portion of, the internal data structure and the internal functions. More particularly, during program design, a program developer can define objects in which all or some of the data variables and all or some of the related method are considered "private" or for use only by the object itself. Other data or methods can be declared "public" or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation process and presents the program from being run.

Polymorphism allows objects and functions which have the same overall format, but which work with different data, to function differently to produce consistent results. For example, an addition method may be defined as variable A+variable B, (A+B). The same format can be used whether the A and B are numbers, characters or dollars and cents. However, the actual program code which performs the addition may differ widely depending on the type of variables which comprise A and B. Thus, each type of variable (numbers, characters and dollars). After the methods have been defined, a program can later refer to the addition method by its common format (A+B) and, during compilation, the compiler will determine which of the three methods to be used by examining the variable types. The compiler will then substitute the proper function code.

A third property of object oriented programming is inheritance which allows program developers to reuse pre-existing programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

Although object oriented programming offers significant improvements over other programming concepts, program development still requires significant outlays of time and effort, especially if no pre-existing software programs are available for modification. Consequently, a set of predefined, interconnected classes are sometimes provided to create a set of objects and additional miscellaneous routines which are all directed to performing commonly encountered tasks in a particular environment. Such predefined classes and libraries are typically called "frameworks" and essentially provide a prefabricated structure as a basis for creating a working application program.

In object oriented programming such as the previously described VRT software platform, there is provided for the user interface a framework containing a set of predefined interface objects. The framework contains predefined classes which can be used as base classes and a developer may accept and incorporate some of the objects into these base classes, or he may modify or override objects or combinations of objects in these base classes to extend the framework and create customized solutions in particular areas of expertise.

This object oriented approach provides a major advantage over traditional programming since the programmer is not changing the original program, but rather extending the capabilities of the original program.

The above-described Superscape Virtual Reality Toolkit (VRT) provides the architectural guidance and modeling, but at the same time frees developers to supply specific actions unique to the particular problem domain which the developer is addressing.

Therefore, those skilled in the art will understand how the present invention is implemented using object oriented programming techniques as described above.

Referring to FIG. 1, a typical data processing system is shown which may be used in conjunction with object oriented software in implementing the present invention. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as DOS, or the OS/2 operating system available from International Business Machines Corporation (OS/2 is a trademark of International Business Machines Corporation). A program application such as the program in the above-mentioned VRT platform 40 runs in conjunction with operating system 41 and provides output calls to the operating system 41 which implements the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN), or the like. I/O devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38.

There will now be described a simple illustration of the present invention. When the images are described, it will be understood that these may be rendered by storing a virtual reality three-dimensional image creation application program 40 such as the previously described VRT of Superscape in the RAM 14 of the system of FIG. 1. Also stored on the RAM will be a suitable operating system 41 such as DOS or Windows.

Figure 2:
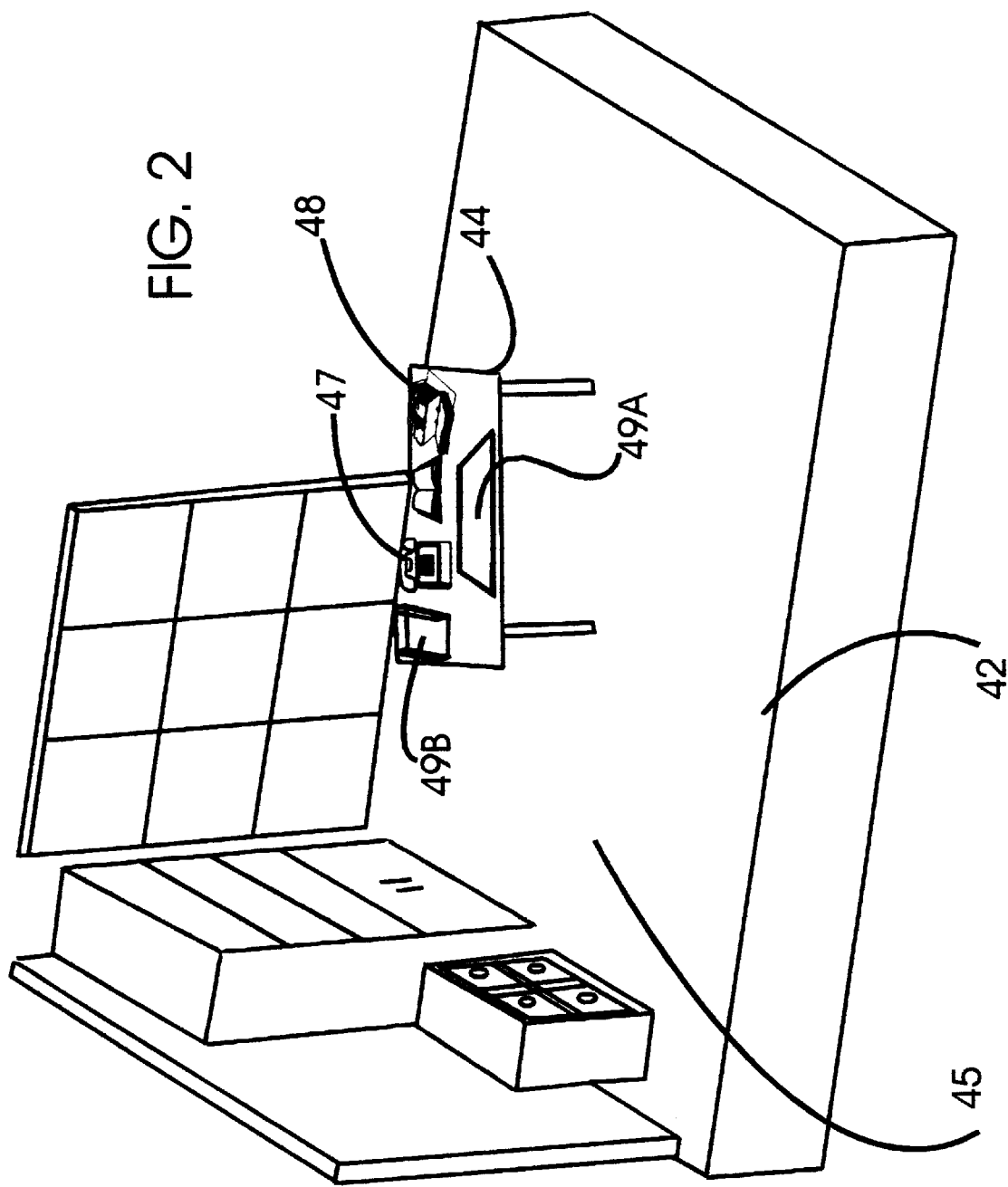
FIG. 2 shows the virtual reality 3-D workspace in a accordance with the present invention at an initial viewpoint before navigation in accordance with the present invention takes place.

An embodiment of the present invention will now be described with respect to the virtual reality workspace shown in FIG. 2. The workspace 42 is shown as an office environment. The workspace 42 is centered within a viewpoint interface which is presented to the viewer on display monitor 38 of FIG. 1. In accordance with conventional techniques, the user may control the viewpoint 45 through a conventional I/O device such as mouse 26 or FIG. 1 which operates through the user interface 22 of FIG. 1 to call upon VRT programs in RAM 14 operating with the operating system 41 to create the images in frame buffer 39 of display adapter 36 to control the display on monitor 38. Using conventional virtual three-dimensional workspace navigation techniques, the viewpoint interface 45 of FIG. 2 is changeable as the viewer moves closer or backs away from objects in the workspace or moves to right or to the left in the workspace. All this may be controlled by a suitable I/O device such as mouse 26 of FIG. 1. The devices within workspace 42 are functional three-dimensional objects such as the "Rolodex" 48, the telephone 47, and the note pad 49. The definitions for these various objects are stored as data from which 3-D views of the objects may be created on the display in RAM 14 of FIG. 1 in connection with the VRT program.

Figure 3:
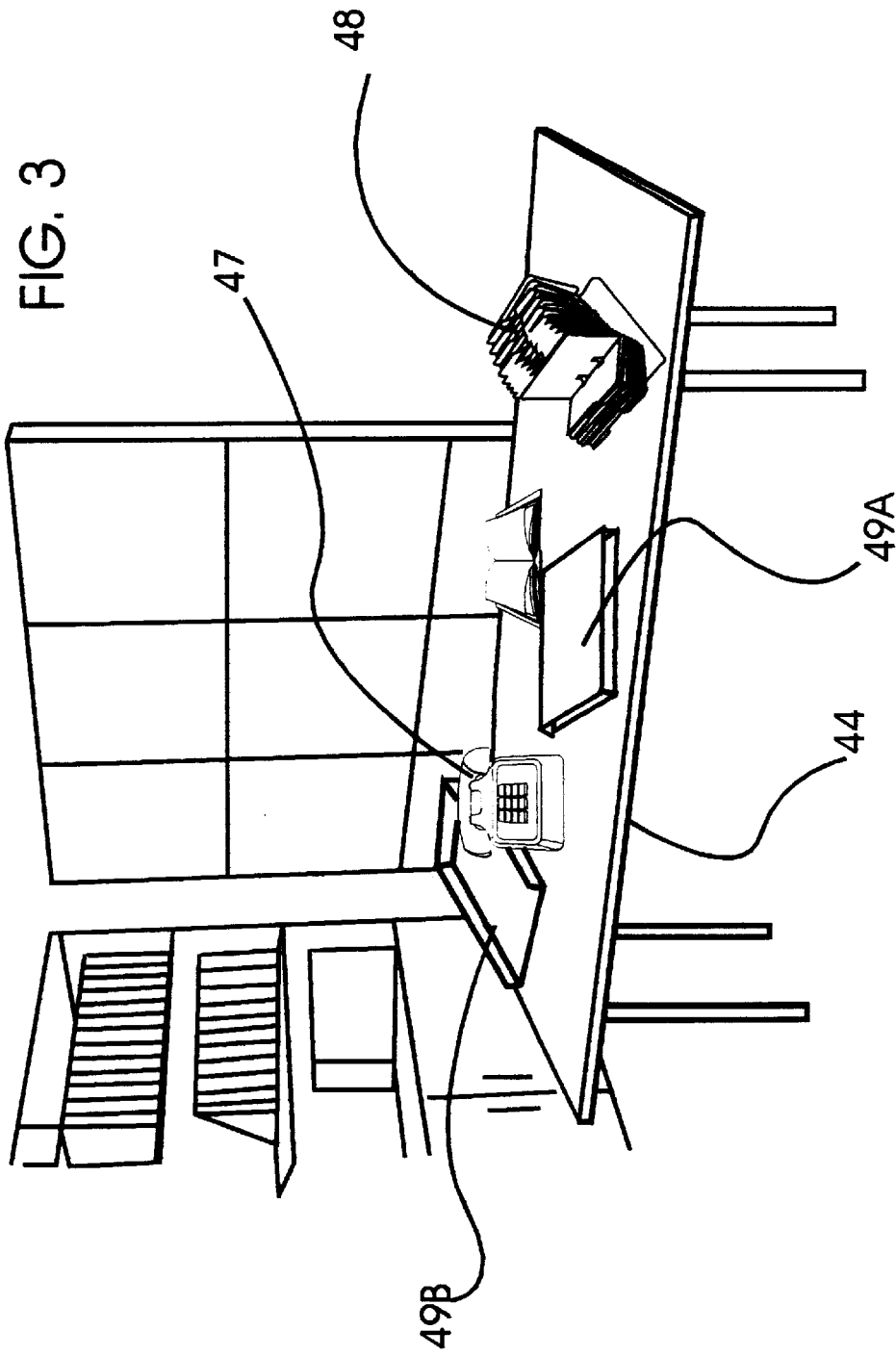
Figure 4:
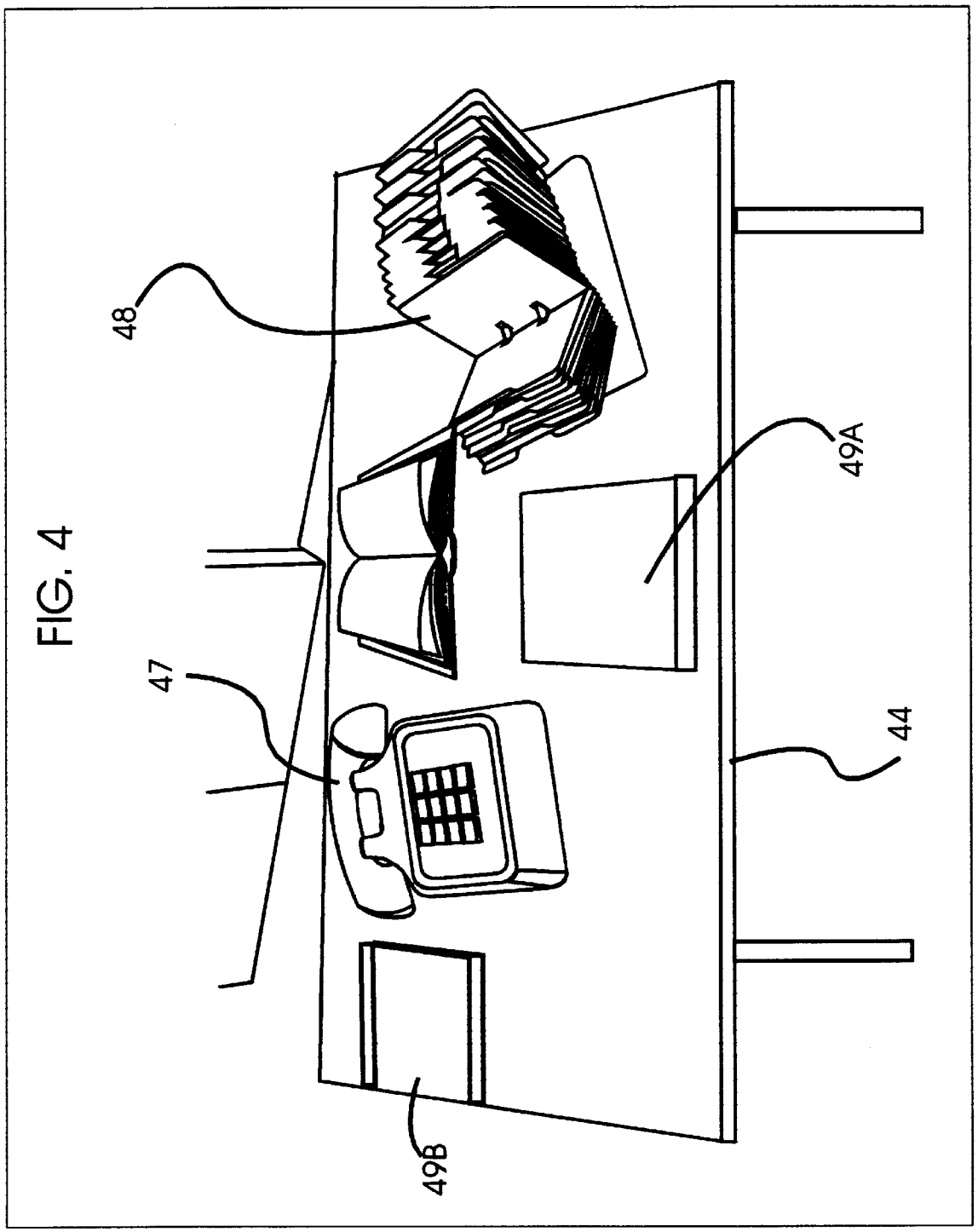
FIG. 4 shows a typical virtual reality further enlarged environmental workspace of FIG. 3, involving the desk environment in accordance with the present invention, at a viewpoint. This view of this workspace area includes a desk along with the typical objects found

Let us assume that a user or viewer is navigating through a three-dimensional workspace in which the viewpoint 45, FIG. 2. When he or she reaches the viewpoint 45 in FIG. 2 the viewer has need to access the telephone which is on the desk 44. The current system provides the viewer with the navigational means of selecting of any one of the objects through some appropriate pointing device such as mouse 26 in FIG. 1. When the viewer clicks onto the desk in FIG. 2 using the mouse 26 in FIG. 1, the result is, as shown in FIG. 3, an enlarged view of the desk 44, containing the 3-D image of the telephone 47 and the "Rolodex" card file 48, the note pad 49A the in-box 49B. The desk 44 and it's contents appear in the three-dimensional workspace as shown in viewpoint 45. The image of the telephone 47, which is on the desk along with the "Rolodex" 48, are interactive. By this is meant that the viewer, by suitable means such as clicking with mouse 26 in FIG. 1 may get an even further enlarged view of the desk and the environmental and interactive objects in the immediate surroundings around the telephone 47 FIG. 4. In FIG. 4 the telephone object is interactive and is suitable for direct user interaction ( e.g. making a phone call).

The method for determining the preferred point of view on any object such as the phone dialing pad on the telephone is to determine, at run time, the amount of surrounding visual context that should be included in the resulting image. This rule for determining necessary visual context is recorded in the object definition as one of it's properties. This heuristic rule is used to determine the position of the virtual camera automatically, at run time, whenever the user requests a preferred point of view on an object such as the phone pad on the cellular phone. As a key embodiment of this invention, when the viewer has completed their interaction with the desired object (e.g. phone call on a telephone) in 3-dimension workspace, the surrounding environment context to the object (e.g. the desk 44, the "Rolodex" card file 48, the pad 49A and the inbox 49B will subsequently be available to participate into the task of placing a phone call, as well as to help orient the viewer or camera to their location in the larger 3-dimensional workspace.

Figure 5:
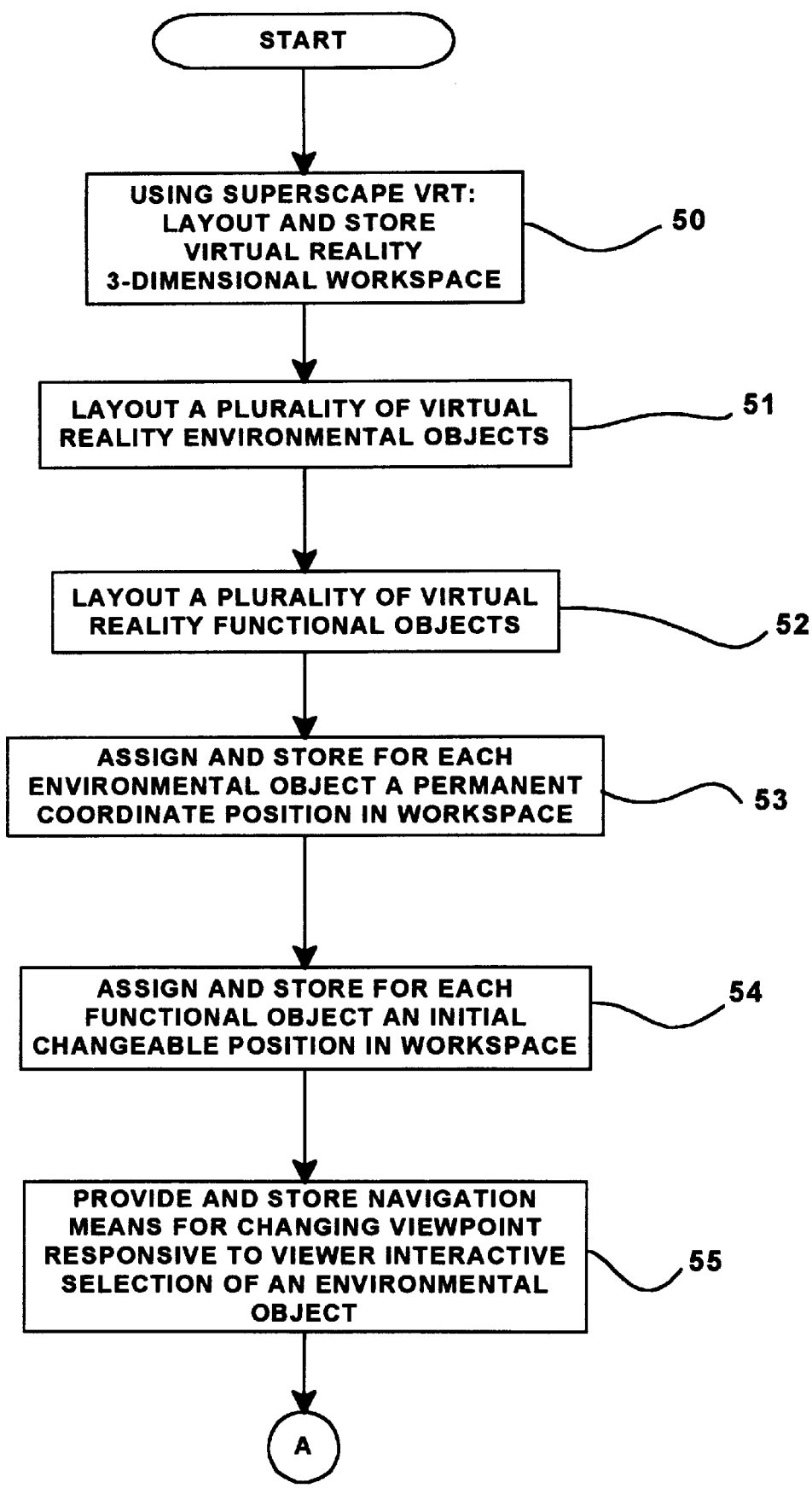
FIGS. 5–6 are block diagrams of the development of the virtual reality landscape objects. on a desk including, a telephone, a "Rolodex" card file,an in-box, a pad and a book These environmental and interactive objects surround the specific object of interest, the telephone,which is ready to be interfaced with by the viewer.
Figure 6:
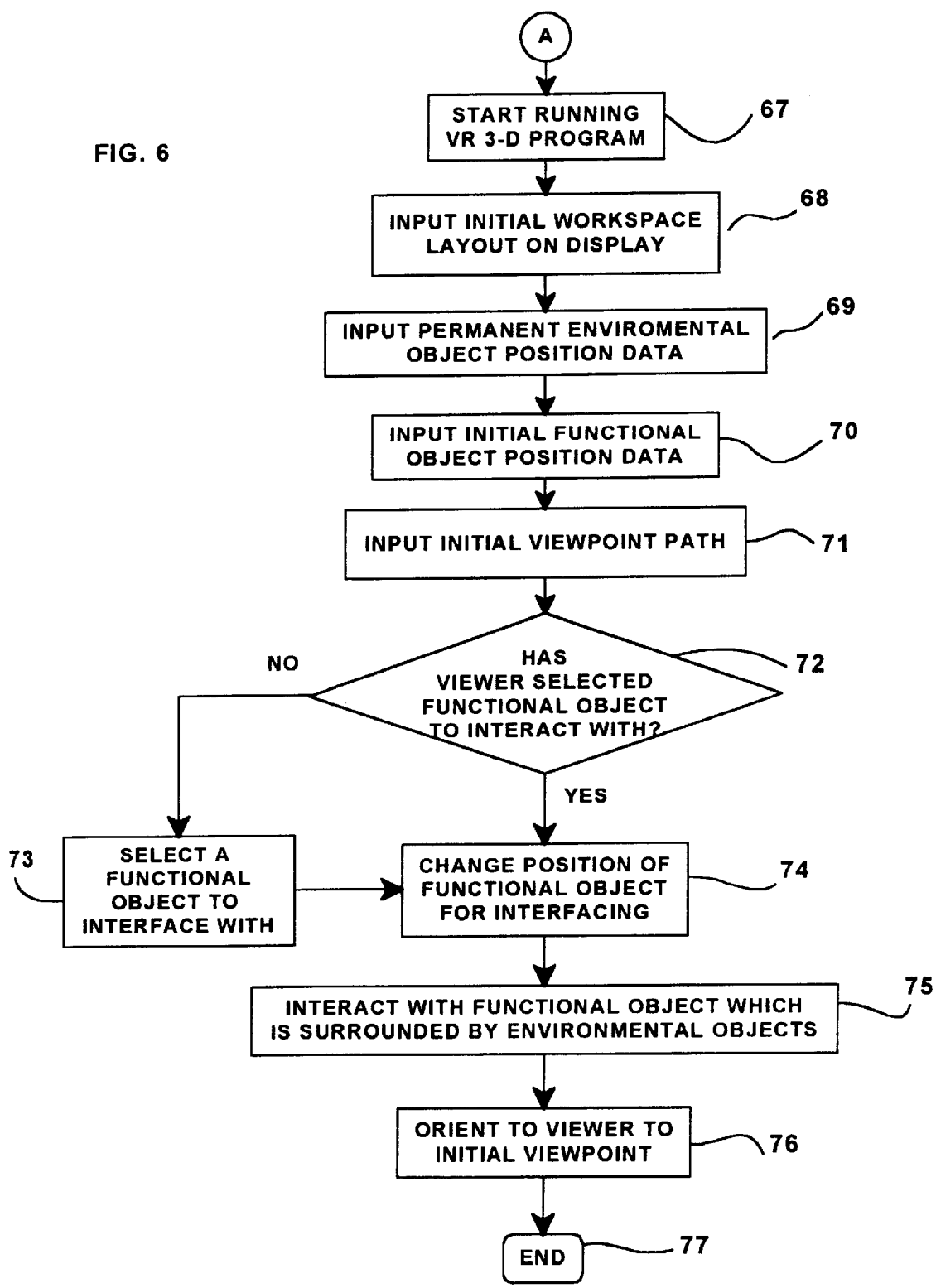

Now with reference to FIGS. 5 and 6, we will describe a process implemented by the present invention in conjunction with the flowcharts. The flowcharts are in two parts: the steps in FIG. 5 relates to the development of the virtual reality landscape objects, the application programs with which particular objects are associated, as well as the two-dimensional interactive user interfaces provided for such application programs. The developments are made in accordance with the present invention using the previously described Superscape VRT object oriented programming toolkit.

First, step 50, FIG. 5 the virtual reality three-dimensional workspace, for example workspace 42, FIG. 2, is created and stored. Next, step 51, the virtual reality 3D environmental objects are created and stored. These would include the object oriented code representation of such objects as the telephone 47, the "Rolodex" card file 48 in FIG. 3. Next, step 52, several user interactive computer programs are stored on the system of FIG. 1. These would be stored in suitable storage means accessible to RAM 14 of FIG. 1 wherein the application programs would be loaded when activated.

Next, step 53, the programmer will assign and store for each environmental object, a permanent coordinate position in workspace. Similarly, in the next step 54, the programmer assigns and stores for each functional object, an initial changeable position in workspace. Then, step 55, the system provides and stores, a means for navigating through the virtual reality workspace 42 in FIGS. 2 through 4.

The process now proceeds to point A in FIG. 6 where at the created virtual reality workspace program is run, step 67. As previously mentioned, the program is run on a system such as that shown in FIG. 1 with the particular application program 40 herein being loaded on RAM 14 and connected to display adapter 36 which forms the stored images via frame buffer 39 controlling display monitor 38. The program initially sets up the workspace layout on display 68 as well as the object layout and as well as input environmental object position data 69. This is then followed by the input of initial functional object position data 70 and input of initial viewpoint data 71.

At this point we will proceed to the aspect of the program applicable to the present invention. First, in decision block 72, the system determines whether the viewer has as yet selected a particular functional object to interface with, which in this case is the telephone 47 in FIG. 3 If not(step 73) then the functional object to be interfaced with (e.g. telephone on desk 44) FIG. 3 is selected. Then the functional object's position is changed 74, which in this case the telephone, into a position of the preferred view such that the viewer can interact with it (e.g. to complete a call) along with the surrounding environmental objects.

The next step 75, involves the viewers interaction with the interactive object (e.g. the telephone) which is surrounded by environmental and interactive functional objects. With the interaction between the viewer and the interactive object completed 76, the viewer is oriented to his or her initial viewpoint and this ends the activity 77.

Although certain preferred embodiments have been shown and described, it will be understood that many changes and modifications may be made therein without departing from the scope and intent of the appended claims.

What is claimed is:

1. A data processor controlled display system for displaying a virtual three-dimensional workspace comprising:
    means for displaying a plurality of virtual three-dimensional objects within said workspace;
    means for presenting to said viewer interface means for navigating within said workspace;
    means for storing for each of a plurality of said virtual objects, one view point including a view of the object and a surrounding portion of the workspace, sufficient to orient the user in functionally interacting with the object, and
    viewer interactive means for driving said navigation means to present said one viewpoint.

2. The processor controlled display system of claim 1 further including:
    means for user interactive selection of one of said three-dimensional objects and moving at least a portion of said selected object to one of two-dimensional images, and
    means responsive to said movement for utilizing a user-interactive function.

3. The display system of claim 1 including a means for changing said three-dimensional object, change the size of said object.

4. The display system of claim 1 including a means for changing said three-dimensional object, changing the position, of said object in said workspace as a means of interfacing with said object.

5. The display system of claim 1 wherein said means for changing said three-dimensional object, changing the position, size and viewpoint of said object in said workspace is determined by said environmental objects that surround said three-dimensional object that is to be interfaced with by said user.

6. The display system of claim 1 wherein said surrounding portion of the workspace of said object being interacted with, serves as a means of orienting said viewer in said three- dimensional workspace upon completion of said object interaction.

7. A data processor implemented method for displaying a virtual three-dimensional workspace comprising:
    displaying a plurality of virtual three-dimensional objects within said workspace;
    presenting to said viewer an interface means for navigating within said workspace;
    storing for each of a plurality of said virtual objects, one view point including a view of the virtual objects, one view point including a view of the object;
    surrounding a portion of the workspace, sufficient to orient the user in functionally interacting with the object, and
    providing said viewer with a interactive means for driving said navigation means to said one viewpoint.

8. The processor controlled display method of claim 7 further:
    providing for user-interactive selection of one of said three-dimensional objects;
    moving at least a portion of said selected object to one of two-dimensional images;
    providing a means responsive to said movement, for initiating a user interactive-function.

9. The display method of claim 7 including a means for changing said three-dimensional object, change the size of said object.

10. The display method of claim 7 including a means for changing said three-dimensional object, changing the position, of said object in said workspace as a means of interfacing with said object.

11. The display method of claim 7 wherein said means for changing said three-dimensional object, changing the position, size and viewpoint of said object in said workspace is determined by said environmental objects that surround said three-dimensional object that is to be interfaced with by said user.

12. The display method of claim 7 wherein said surrounding portion of the workspace of said object being interacted with, serves as a means of orienting said viewer in said three-dimensional workspace upon completion of said object interaction.

13. A computer readable program having data structures included on a computer readable medium which causes the display on a data processor controlled display of a virtual three-dimensional workspace comprising:

means for displaying a plurality of virtual three-dimensional objects within said workspace;

means for presenting to said viewer interface means for navigating within said workspace;

means for storing for each of a plurality of said virtual objects, one view point including a view of the object and a surrounding portion of the workspace, sufficient to orient the user in functionally interacting with the object, and viewer interactive means for driving said navigation means to present said one viewpoint.

14. The computer readable program of claim 13 further including:

means for user interactive selection of one of said three-dimensional objects and moving at least a portion of said selected object to one of two-dimensional images, and means responsive to said movement for utilizing a user-interactive function.

15. The computer readable program of claim 13 wherein said means for changing said three-dimensional object, change the size of said object.

16. The computer readable program of claim 13 including a means for changing said three-dimensional object, changing the position, of said object in said workspace as a means of interfacing with said object.

17. The computer readable program of claim 13, including a means for changing said three-dimensional object, changing the position, size and viewpoint of said object in said workspace is determined by said environmental objects that surround said three-dimensional object that is to be interfaced with by said user.

18. The computer readable program of claim 13, wherein said surrounding portion of the workspace of said object being interacted with, serves as a means of orienting said viewer in said three-dimensional workspace upon completion of said object interaction.

* * * * *